US007979265B2

(12) United States Patent
Suzuki et al.

(10) Patent No.: US 7,979,265 B2
(45) Date of Patent: Jul. 12, 2011

(54) MACHINE TRANSLATION SYSTEM, METHOD AND PROGRAM FOR TRANSLATING TEXT HAVING A STRUCTURE

(75) Inventors: Hirokazu Suzuki, Machida (JP); Akira Kumano, Ichihara (JP)

(73) Assignee: Kabushiki Kaisha Toshiba, Tokyo (JP)

(*) Notice: Subject to any disclaimer, the term of this patent is extended or adjusted under 35 U.S.C. 154(b) by 728 days.

(21) Appl. No.: 11/262,919

(22) Filed: Nov. 1, 2005

(65) Prior Publication Data

US 2006/0116866 A1 Jun. 1, 2006

(30) Foreign Application Priority Data

Nov. 2, 2004 (JP) ................................ 2004-319708

(51) Int. Cl.
*G06F 17/28* (2006.01)
*G06F 17/21* (2006.01)
(52) U.S. Cl. ............. 704/4; 704/2; 704/3; 704/5; 704/7; 704/10
(58) Field of Classification Search .................. 704/2–5, 704/7, 10
See application file for complete search history.

(56) References Cited

U.S. PATENT DOCUMENTS

| | | | | |
|---|---|---|---|---|
| 4,661,924 | A * | 4/1987 | Okamoto et al. | 704/8 |
| 5,084,817 | A * | 1/1992 | Kumano et al. | 704/4 |
| 5,510,981 | A * | 4/1996 | Berger et al. | 704/2 |
| 5,640,575 | A * | 6/1997 | Maruyama et al. | 704/4 |
| 5,826,219 | A * | 10/1998 | Kutsumi | 704/4 |
| 5,845,143 | A * | 12/1998 | Yamauchi et al. | 704/2 |
| 6,275,789 | B1 * | 8/2001 | Moser et al. | 704/7 |
| 6,526,426 | B1 * | 2/2003 | Lakritz | 715/264 |
| 7,295,964 | B2 * | 11/2007 | Suzuki | 704/2 |
| 7,353,165 | B2 * | 4/2008 | Zhou et al. | 704/2 |
| 2003/0004704 | A1 * | 1/2003 | Baron | 704/8 |
| 2003/0229487 | A1 * | 12/2003 | Wang | 704/4 |
| 2005/0137845 | A1 * | 6/2005 | Carroll et al. | 704/2 |
| 2005/0171757 | A1 * | 8/2005 | Appleby | 704/2 |
| 2005/0256698 | A1 * | 11/2005 | Becks | 704/2 |

FOREIGN PATENT DOCUMENTS

JP 3-175573 7/1991

OTHER PUBLICATIONS

Nagao et al. "Machine Translation from Japanese into English", Proceedings of the IEEE, vol. 74, Jul. 1986.*
Dorr et al. "A Survey of Current Paradigms in Machine Translation", Unversity of Maryland, 1998.*
Slocum "A survey of machine translation: its history, current status, and future prospects", Computational Linguistics, vol. 11, Mar. 1985.*
Somers, "Review article: Example-based Machine Translation", Machine Translation, vol. 14, 1999.*

* cited by examiner

*Primary Examiner* — James S Wozniak
*Assistant Examiner* — Jialong He
(74) *Attorney, Agent, or Firm* — Finnegan, Henderson, Farabow, Garrett & Dunner, L.L.P.

(57) ABSTRACT

Machine translation system includes storage unit configured to store interpretation data items each including first expression element representing first expression of first language, word set element including first expression, and second expression element representing second expression of second language, first expression being to be translated into second expression, first expression and second expression belonging to category, acquiring unit configured to acquire predetermined expression of first language, predetermined expression being contained in to-be-translated text having structure, detecting unit configured to detect, from interpretation data items, interpretation data items each including expression element representing predetermined expression, selection unit configured to select, from detected interpretation data items, interpretation data item including word set element corresponding to same attribute or equivalent positional relationship in structure, and translation unit configured to translate predetermined expression into second language, using selected interpretation data item.

21 Claims, 5 Drawing Sheets

| Day of the week | Observation target | Observation district |
|---|---|---|
| 月 | 月 | 関東 |
| 火 | 火星 | 九州 |
| 水 | 水星 | 四国 |
| 木 | 木星 | 中国 |
| 金 | 金星 | 北海道 |
| 土 | 土星 | 関西 |

| Storage number | Table structure | Table data |
|---|---|---|
| 1 | 7*3 | Day of the week／Observation target／Observation district／月／月／関東／火／火星／九州／水／水星／四国／木／木星／中国／金／金星／北海道／土／土星／関西／ |
| 2 | | |
| 3 | | |

FIG. 3

| |
|---|
| 月；Noun；Monday；月／火／水／木／金／土／日 |
| 火；Noun；Tuesday；月／火／水／木／金／土／日 |
| ・・・・・ |
| 土；Noun；Saturday；月／火／水／木／金／土／日 |
| 日；Noun；Sunday；月／火／水／木／金／土／日 |
| ・・・・・ |
| 月；Noun；Moon；月／地球／火星／木星／金星／土星／太陽 |
| ・・・・・ |
| 関東；Noun；Kanto；九州／四国／中国／近畿／中部／北陸／関東／関西／首都圏／東北／北海道 |
| 九州；Noun；Kyushu；九州／四国／中国／近畿／中部／北陸／関東／関西／首都圏／東北／北海道 |
| ・・・・・ |
| 中国；Noun；Chugoku；九州／四国／中国／近畿／中部／北陸／関東／関西／首都圏／東北／北海道 |
| 四国；Noun；Shikoku；九州／四国／中国／近畿／中部／北陸／関東／関西／首都圏／東北／北海道 |
| ・・・・・ |

FIG. 4

| Overview | Agenda | Registration | Participants List | Speaker Info | Fees Info |
|---|---|---|---|---|---|
| Theme of computer component | CPU | Drive | Memory | Monitor | Speaker | Display |
| Home | Top | Back | What's new | FAQ | Contact |

FIG. 6

| # of Storage | Stored Data |
|---|---|
| 1 | Overview / Agenda / Registration / Participants List / Speaker Info / Fee Info / Theme of computer component / CPU / Drive / Memory / Monitor / Speaker / Display / Home / Top / Back / What's new / FAQ / Contact |
| 2 | |
| 3 | |

FIG. 7

| |
|---|
| Overview;noun;概要;Overview / Agenda / Registration / Fees Info / Speaker Info / Participants List |
| Agenda;noun;日程;Overview / Agenda / Registration / Fees Info / Speaker Info / Participants List |
| . . . . |
| Speaker;Info;n;講演者情報;Overview / Agenda / Registration / Fees Info / Speaker Info / Participants List |
| Participants List;n;参加者リスト;Overview / Agenda / Registration / Fees Info / Speaker Info / Participants List |
| . . . . |
| Drive;noun;ドライブ;CPU / Chipset / Display / Drive / HDD / Memory / OS |
| Speaker;noun;スピーカー;CPU / Chipset / Display / Drive / HDD / Memory / OS |
| . . . . |
| Home;noun;ホーム;Home / Top / Back / What's New / Contact / Search / FAQ / Site map |
| Back;noun;戻る;Home / Top / Back / What's New / Contact / Search / FAQ / Site map |
| . . . . |
| What's new;noun;新着情報;Home / Top / Back / What's New / Contact / Search / FAQ / Site map |
| Contact;noun;お問い合わせ;Home / Top / Back / What's New / Contact / Search / FAQ / Site map |
| . . . . |

FIG. 8

MACHINE TRANSLATION SYSTEM, METHOD AND PROGRAM FOR TRANSLATING TEXT HAVING A STRUCTURE

CROSS-REFERENCE TO RELATED APPLICATIONS

This application is based upon and claims the benefit of priority from prior Japanese Patent Application No. 2004-319708, filed Nov. 2, 2004, the entire contents of which are incorporated herein by reference.

BACKGROUND OF THE INVENTION

1. Field of the Invention

The present invention relates to a machine translation system, method and program.

2. Description of the Related Art

In a machine translation system in which sentences written in a first language (source language) are translated into those written in a second language (target language) using a computer, firstly, an input sentence is divided into predetermined translation units (such as words and phrases) by morpheme analysis or sentence structure analysis. Subsequently, a translation dictionary is searched in units of processing to determine a translation rule to be applied, thereby determining corresponding translation words (phrase). The determined words (phrases) are connected in accordance with a predetermined translation rule, thereby acquiring a translation corresponding to the input sentence.

In a document having a structure, such as a table structure or enumerated structure in which words or sentences are arranged in order, if the table structure or enumerated structure is translated, a word or sentence in each cell of the table, or an enumerated word or sentence is extracted and input for translation to such a machine translation system as the above.

Sentences, such as sentences in cells of a table, or enumerated ones, which are regularly arranged as structural elements, may well have no grammatically correct structures or may well be very short. Accordingly, the above-mentioned method, in which sentences are extracted one by one from a table structure or enumerated structure and subjected to machine translation, does not provide much information that can be used as a key to analysis for translation or to selection of one from possible translations, resulting in degradation of translation accuracy.

When translating standard sentences, co-occurrence information in a sentence or in context is utilized (see, for example, Jpn. Pat. Appln. KOKAI Publication No. 3-175573). However, if this method is directly applied to translation of data of a table structure or enumerated structure, it is difficult to output stable translation results since the manner of co-occurrence may vary depending upon the arrangement of sentences in the structure.

Specifically, in the case of, for example, an enumerated structure of (イ) 月, (ロ) 火,(ハ) 水 ...,Japanese characters (イ) , (ロ)and (ハ)belong to a category of "order". Therefore, it is desirable that Japanese characters (イ) , (ロ)and (ハ)be translated into numerals (1), (2) and (3), or alphabets (a), (b) and (c), respectively. 月, 火, 水 are Japanese words. 月means Monday (Getsu) or moon (Tsuki), 火means Tuesday (Ka) or fire (Hi), and 水means Wednesday (Sui) or water (Mizu). There is a similar enumerated structure of (ア) 月, (イ) 火,(ウ) 水 ....In this case, Japanese characters (ア) , (イ)and (ウ)also belong to the category of "order". In this case, it is desirable that Japanese characters (ア) , (イ)and (ウ)be translated into numerals (1), (2) and (3), or alphabets (a), (b) and (c), respectively. Thus, in the former case, Japanese character (イ)should be translated into (1) or (a), whereas in the latter case, the same Japanese character (イ)should be translated into (2) or (b). Moreover, there may be even a case where enumerated structures are included in a nested structure, in which two or more ambiguous characters, such as the above-mentioned character (イ)may well appear. In the conventional translation using co-occurrence information, translation cannot be performed in consideration of the rule of an enumerated structure, under which the characters are arranged regularly. Accordingly, characters, which are ambiguous like the above-mentioned character (イ)may be translated wrongly, which degrades the quality of translation. Further, the set of Japanese characters (words) 月(Getsu), 火(Ka), 水(Sui) . . . included in the enumerated structure indicates that these words actually belong to a category of "a day of the week". Accordingly, these words should be translated into "Monday", "Tuesday", "Wednesday", . . . , respectively. However, Japanese words 月, 火, 水 ...also mean "moon", "fire", "water", . . . , respectively. In the prior art translation technique in which translation cannot be performed in consideration of the rule of such an enumerated structure as the above, under which the words are arranged regularly, words 月, 火, 水 .... may well be translated into such standard (default) translation words as "moon", "fire", "water", . . . , respectively.

The same can be said of a table structure. Specifically, when in the table structure, cells that store Japanese words 月, 火, 水 ...exist at the index rows (columns) of each column (row), these words should be translated into "Monday", "Tuesday", "Wednesday", . . . since the set of words 月, 火, 水 ...indicates that these words belong to the category of "day of the week". In the prior art technique, however, words 月, 火, 水 ...may well be translated into such standard (default) translation words as "moon", "fire", "water", . . . , respectively, as in the case of the enumerated structure, because translation cannot be performed in consideration of the rule of the row (column) direction of the table structure, under which the words are arranged regularly. If the translation method utilizing co-occurrence information is applied to the translation of a table, it is possible that the translation of a certain cell may be influenced by other cells in the table having a low degree of relationship with respect to the certain cell (e.g., the cells located obliquely above or below). Thus, stable translation is still difficult.

As described above, the prior art techniques cannot accurately translate a document having a table structure or enumerated structure in which words or sentences are regularly arranged.

BRIEF SUMMARY OF THE INVENTION

In accordance with a first aspect of the invention, there is provided a machine translation system comprising: a storage unit configured to store a plurality of interpretation data items each including a first expression element representing a first expression of a first language, a word set element including the first expression and a second expression element representing a second expression of a second language, the first expression being to be translated into the second expression, the first expression and the second expression belonging to a category; an acquiring unit configured to acquire a predetermined expression of the first language, the predetermined expression being contained in a to-be-translated text having a structure; a detecting unit configured to detect, from the interpretation data items, a plurality of interpretation data items each including an expression element representing the predetermined expression; a selection unit configured to select, from the detected interpretation data items, an interpretation data item including a word set element corresponding to a same attribute or an equivalent positional relationship in the structure; and a translation unit configured to translate the predetermined expression into the second language, using the selected interpretation data item.

According to a second aspect of the invention, there is provided a machine translation method comprising: preparing a storage unit configured to store a plurality of interpretation data items each including a first expression element representing a first expression of a first language, a word set element including the first expression and a second expression element representing a second expression of a second language, the first expression being to be translated into the second expression, the first expression and the second expression belonging to a category; acquiring a predetermined expression of the first language, the predetermined expression being contained in a to-be-translated text having a structure; detecting, from the interpretation data items, a plurality of interpretation data items each including an expression element representing the predetermined expression; selecting, from the detected interpretation data items, an interpretation data item including a word set element corresponding to a same attribute or an equivalent positional relationship in the structure; and translating the predetermined expression into the second language, using the selected interpretation data item.

According to a third aspect of the invention, there is provided a program stored in a computer readable recording medium, comprising: means for instructing a computer to access a storage unit configured to store a plurality of interpretation data items each including a first expression element representing a first expression of a first language, a word set element including the first expression and a second expression element representing a second expression of a second language, the first expression being to be translated into the second expression, the first expression and the second expression belonging to a category; means for instructing the computer to acquire a predetermined expression of the first language, the predetermined expression being contained in a to-be-translated text having a structure; means for instructing the computer to detect, from the interpretation data items, a plurality of interpretation data items each including an expression element representing the predetermined expression; means for instructing the computer to select, from the detected interpretation data items, an interpretation data item including a word set element corresponding to a same attribute or an equivalent positional relationship in the structure; and means for instructing the computer to translate the predetermined expression into the second language, using the selected interpretation data item.

BRIEF DESCRIPTION OF THE SEVERAL VIEWS OF THE DRAWING

FIG. 3 is a view illustrating data example in each cell of the table of FIG. 2, which is stored in an intra-structure data storing unit;

FIG. 4 is a view illustrating a specific example of interpretation data stored in an intra-structure interpretation database;

FIG. 6 is a view illustrating a document having, for example, a table structure;

FIG. 7 is a view illustrating data example in each cell of the table of FIG. 6, which is stored in an intra-structure data storing unit; and FIG. 8 is a view illustrating a specific example of interpretation data stored in an intra-structure interpretation database.

DETAILED DESCRIPTION OF THE INVENTION

An embodiment of the invention will be described in detail with reference to the accompanying drawings.

The embodiment of the invention has been developed in light of the above-described problems, and aims to provide a machine translation system for highly accurately and reliably translating a document having a table structure or enumerated structure. It also aims to provide a machine translation method and program used in the machine translation system.

The embodiment of the invention can highly accurately and reliably translate a document having a table structure or enumerated structure.

Figures 1, 2:
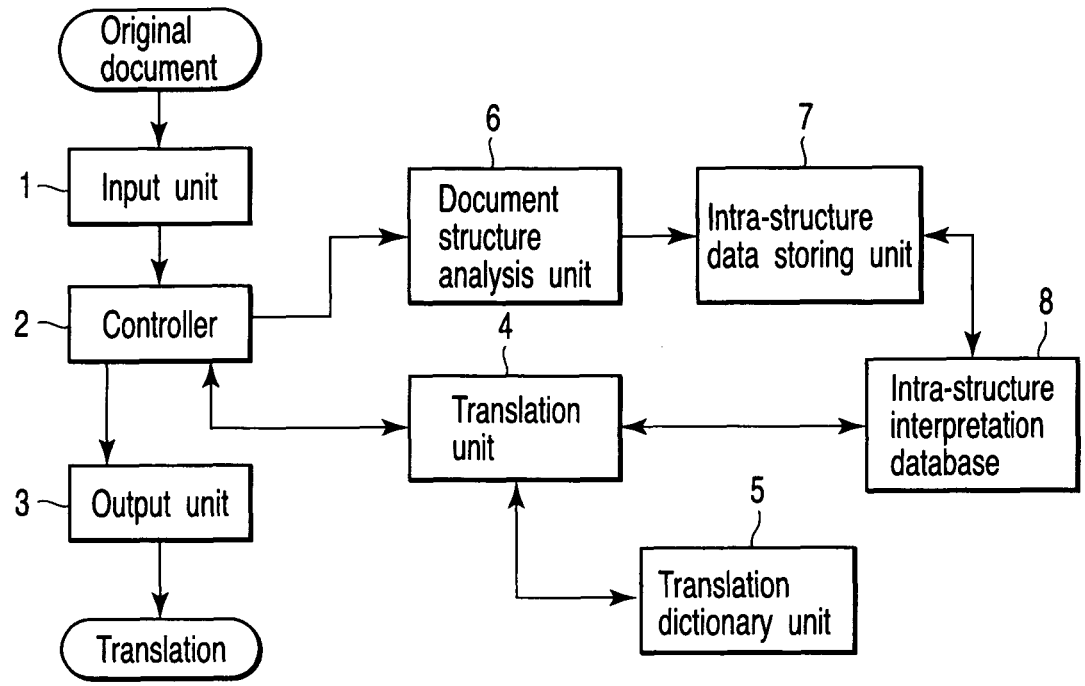
FIG. 1 is a block diagram illustrating a structure example of a machine translation system according to an embodiment of the invention.
FIG. 2 is a view illustrating a document having, for example, a table structure.

FIG. 1 is a block diagram illustrating a structure example of a machine translation system according to the embodiment of the invention.

As shown, an input unit 1 acquires the electronic data (hereinafter referred to simply as "a document") of a document (original document) as a translation target, and output it to a controller 2. The input unit 1 is formed of, for example, a keyboard, mouse, etc., and is operated by a user to input a document. The input unit 1 may be formed of a reading unit for reading data from a computer-readable medium, such as an optical character reader (OCR), floppy disk, magnetic tape, magnetic disk or optical disk. The input unit 1 supplies the thus-read document to the controller 2. Further, the input unit 1 is used to supply various commands to the controller 2.

An output unit 3 outputs a translation result supplied from the controller 2. Further, the output unit 3 displays, for example, the translation result on the screen of a display unit (not shown) under the control of the controller 2. The output unit 3 outputs the translation result in the form of sound, and displays a response made by the controller 2 in reply to a command.

The output unit 3 may be formed of, as well as various types of display units, a printing unit, or an output unit for outputting data to a computer-readable medium, such as an optical character reader (OCR), floppy disk, magnetic tape, magnetic disk or optical disk, or a transmission unit for transmitting a document to another medium.

A translation unit 4 performs, under the control of the controller 2, translation processing on an original document input from the input unit 1, using a translation dictionary 5 described later, and outputs the translation result to the controller 2.

The translation dictionary 5 stores a vocabulary dictionary (not shown), and various rules necessary for translation processing. For instance, the translation dictionary 5 stores a word/idiom dictionary, morpheme analysis rules, structure/meaning analysis rules, translation conversion rules, translation generation rules, etc.

The controller 2 detects, in a to-be-translated document, a structure in which words or sentences (expression elements) are arranged regularly, such as a table structure, enumerated structure, or hierarchical structure such as a chapter or section. Specifically, when detecting a chapter or section in a to-be-translated document, a character string, which includes a character string (e.g., "The first chapter", "The second chapter", . . . , "Ch", "Sec", etc.) generally included in the title sentence of a chapter or section, is determined to be the title sentence of a chapter or section. Thus, the chapter or section is detected. Similarly, when detecting a table structure, ruled-line data is detected in a document, and it is determined whether the ruled lines define a rectangle, and whether the rectangle contains areas divided by other ruled lines. In the case of an enumerated structure, it can be detected based on an indent or a symbol attached at the top of each sentence. Further, if a to-be-translated document is a structured document with tags, such as HTML or XML, it can be easily detected by detecting the tags.

When a structure, such as a table structure or hierarchical structure, is detected in a to-be-translated document, the controller 2 transmits, to a document structure analysis unit 6, the entire detected structure included in the to-be-translated document. The document structure analysis unit 6 analyzes the structure, and extracts, from the structure, a set of words, phrases or sentences (expression elements) (hereinafter referred to simply as "a word set element (expression set element)") arranged as the components of the structure.

An intra-structure data storing unit 7 stores the word set element included in the detected structure and extracted by the document structure analysis unit 6. The stored data is erased at an appropriate time, e.g., when the detected structure has been entirely translated.

If the to-be-translated structure is a nested structure, the document structure analysis unit 6 may search the entire structure and store all word set elements in the intra-structure data storing unit 7, or may perform, for example, structure analysis in a feedback manner to realize processing in units of small structures that are included in the structure. In this case, if the intra-structure data storing unit 7 utilizes a data structure such as a stack structure, the word set elements contained in the structure can be stored in a feedback manner. Erasure of stored data may be performed each when structure analysis processing performed in a feedback manner is finished.

An intra-structure interpretation database 8 stores a plurality of interpretation data items. These data items include data indicating words or sentences in a structure that may easily be wrongly interpreted, and word set elements belonging to the same domains as the to-be-translated words or sentences. The data items further indicate techniques as to how the to-be-translated words or sentences should be translated (interpreted) if the word set elements, which belong to the same domains as the to-be-translated words or sentences, have the same attributes as the to-be-translated words or sentences or have an equivalent relationship in structure to that of the to-be-translated words or sentences. Each interpretation data item may further include a condition under which matching with the word set element included therein is performed. The condition indicates, for example, a minimum number of matching occasions, a limit to the order of appearance of the words included in the word set element, or a determination as to whether perfect matching is required or imperfect matching is allowable.

During translation, the translation unit 4 inquires of the intra-structure interpretation database 8 whether the database 8 contains interpretation data applicable to each word set element stored in the intra-structure data storing unit 7. In this case, when the interpretation data contains the above-described condition, the intra-structure interpretation database 8 determines, using the condition, whether the word set elements in the structure are identical to those in the interpretation data. If there is no applicable interpretation data, this is reported to the translation unit 4, and standard translation processing is performed. If applicable interpretation data is detected, it is sent to the translation unit 4, where interpretation concerning each to-be-translated word is replaced with that of the interpretation data, thereby performing translation processing.

Referring now to the flowchart of FIG. 5, a more detailed description will be given of the operation of the machine translation system of FIG. 1, using, as an example, translation of a document having the table structure shown in FIG. 2.

When document data having the table structure shown in FIG. 2 is input as original document data to the input unit 1, the input unit 1 transmits the document data to the controller 2. The controller 2 determines whether the input original document data is formed of a standard sentence or a sentence having a structure. If it is determined that the input sentence has a structure, then the type of the structure is determined, i.e., it is determined whether the structure is, for example, a table structure, enumerated structure or chapter/section structure. In this case, since the input document is a table, the entire table of FIG. 2 is sent to the document structure analysis unit 6 (step S1).

The document structure analysis unit 6 analyzes the received table-structure data. In this case, it is determined that the data is the table of seven rows and three columns shown in FIG. 2, thereby extracting a word set element contained in each cell and sending it to the intra-structure data storing unit 7 (step S2).

The intra-structure data storing unit 7 stores the table data extracted by the document structure analysis unit 6. At this time, the table data is stored so that its column data and row data can be discriminated. For instance, the data may be stored in a one-dimensional form so that the relationship between the words and cells contained in the table of seven rows and three columns will be clear. FIG. 3 shows this example. As shown, information indicating that the table of FIG. 2 is formed of seven rows and three columns is stored, and the words in the cells of FIG. 2 ranging from the cell of the first row and first column to the cell of the seventh row and third column are connected by separators "/" in a one-dimensional manner. If the words separated by "/" are sequentially followed, it is detected in which row and column each word is positioned. Alternatively, concerning words in, for example, (m×n) cells, information such as coordinates (m, n) may be attached to a word in each cell, and the words with the information be stored individually.

The controller 2 reads the words one by one from the cells of the table shown in FIG. 2, and sends the read word to the translation unit 2 along with, for example, the coordinate information of each cell (step S3). The translation unit 4, in turn, starts to translate each original word, sent from the controller 2, into the corresponding words of a target language, utilizing knowledge (word/vocabulary dictionary, morpheme analysis rules, structure/meaning analysis rules, conversion rules, generation rules) stored in the translation dictionary 5. At this time, the translation unit 4 sends, to the intra-structure interpretation database 8, information indicating the currently translated original word, and the coordinate information sent from the controller 2, thereby inquiring of the database 8 whether applicable interpretation data exists.

Assume here that the original word is Japanese word "月" contained in the cell of the first column and second row in the table of FIG. 2. In this case, only word "月" may be sent as the original word. Alternatively, morpheme analysis may be performed on it, and the word and the analysis result be sent. Similarly, a structure analysis result, meaning analysis result, conversion result and/or generation result may be sent together with the word. Further, data (2, 1) is sent as coordinate data, since the original word is positioned at the second row and first column.

FIG. 4 shows an example of interpretation data stored in the intra-structure interpretation database 8. The interpretation data corresponds to each word or sentence in a word or sentence set (expression set element) that belongs to an arbitrary category, such as a day of the week or the name of a district in Japan, included in a first language (e.g., Japanese). The interpretation data is used to translate such a word or sentence as the above into a corresponding word or sentence that belongs to the corresponding category in a second language (e.g., English). Each interpretation data item contains a headword, part of speech, translation, and a word or sentence set that includes the headword and belongs to an arbitrary category. In the case of FIG. 4, the words included in the word set element are connected by separators "/". If the order of appearance of the words of a word set element included in interpretation data is predetermined, the words are arranged in the predetermined order. As well as the word set element, the interpretation data may include a condition for determining that a word set element extracted from original document data is identical to the word set element included in the interpretation data. The condition indicates, for example, a minimum number of words that are included in the words extracted from the original document data and are identical to the words included in the word set element of the interpretation data. In the case of an English word set element, the condition may indicate whether capital and small letters should be discriminated from each other. The condition may also indicate that the order of appearance (arrangement) of words should be considered. These conditions will be described later in more detail.

Upon receiving, from the translation unit 4, information concerning the to-be-translated original document data, and the coordinate information, the intra-structure interpretation database 8 accesses the intra-structure data storing unit 7 to acquire, based on the received coordinate information, a word set element arranged in the same column or row as that in the presently processed table (step S4). In this case, since the coordinates are (2, 1), the word set element corresponding to the cells of the second row, and the word set element corresponding to the cells of the first column are acquired from the data shown in FIG. 3 and stored in the intra-structure data storing unit 7. From FIG. 3, the word set element in the second row is "月 (Gutsu), 月(Tsuki), 関東(Kanto, means the Kanto region, which is the name of a certain district in Japan)" (word set element A). Similarly, the word set element in the first column is "Day of the week, 月(Getsu, means Monday), 火(Ka, means Tuesday), 水(Sui, means Wednesday), 木(Moku, means Thursday), 金(Kin, means Friday), 土(Do, means Saturday)" (word set element B).

After acquiring word set elements A and B from the. intra-structure data storing unit 7, the intra-structure interpretation database 8 searches for interpretation data based on the original document data acquired from the translation unit 4. Using, for example, headword 月 as a key, the interpretation data shown in FIG. 4 is searched (step S5). Assume here that the following two interpretation data items are acquired:

"月 ;Noun; Monday;月/火/水/木/金/土/日"
"月 ;Noun; Moon;月/地球/火星/水星/木星/金星/土星/太陽"

The two interpretation data items contain respective word set elements "月(Getsu), 火(Ka), 水(Sui), 木(Moku), 金(Kin), 土(Do), 日(Nichi)" (word set element C) and ""月 (Tsuki, means moon), 地球(Chikyu, means the earth), 火星(Kasei, means Mars), 木星(Suisei, means Mercury), 水星(Mokusei, means Jupiter), 金星(Kinsei, means Venus), 土星(Dosei, means Saturn), 太陽(Tasiyou, means the Sun)" (word set element D). At this time, matching is performed between word set elements C and D, and word set elements A and B acquired from the original document data and stored in the intra-structure data storing unit 7 (step S6). For this matching, the above-described condition can be utilized effectively. For instance, to determine whether a word set element included in certain original document data is identical to a word set element included in certain interpretation data, the condition that k words or more included in the word set element of the original document data must be identical to those of the interpretation data may be employed. Alternatively, the condition that all words of the word set element must be identical between the original document data and the interpretation data may be employed. Similarly, the condition that only part of the word set element is identical between the original document data and the interpretation data may be employed. Further, the condition that all words of the word set element and even the order of arrangement of the words must be identical between the original document data and the interpretation data may be employed. Appropriate use of these conditions enables the matching process to be controlled freely.

In the above-mentioned case, the intra-structure interpretation database 8 determines that word set elements B and C are identical to each other, since the degree of matching therebetween is high. Accordingly, the former interpretation data item, i.e., "月 ;Noun; Monday; 月/火/水/木/金/土/日",is selected (step S7). As is evident from the interpretation data items, each interpretation data item contains information, such as "part of speech" and "translation word", necessary for translation. In the case of the selected interpretation data item, "Monday" is selected as a translation of Japanese word "月"in the cell of the first column and second row in the table of FIG. 2, and is sent to the translation unit 4.

Upon receiving the interpretation result from the intra-structure interpretation database 8, the translation unit 4 performs translation processing based on the received interpretation result, and sends the translation result, i.e., the translation word "Monday", to the controller 2.

Upon receiving the translation result, the controller 2 sends it to the output unit 3 (step S8).

Thus, the machine translation system of FIG. 1 can output a correct translation result. In the same manner as the above, Japanese word "月"in the cell of the second column and second row in the table of FIG. 2 is translated into "Moon". Namely, the same words existing in the same row but having different meanings can be correctly translated into different words corresponding to the respective meanings, by referring to each word in each column. Further, Japanese word "中国"positioned at the fifth row and third column of the table of FIG. 2, which means various districts including "China", is hard to accurately translate. However, in the machine translation system of FIG. 1, Japanese word "中国"can be correctly translated into "Chugoku" (which is the name of a certain district in Japan) instead of, for example, "China", referring to the words in the third column of the table of FIG. 2, which include Japanese word "中国"itself.

When a translation target has an enumerated structure or chapter/section structure, it is sufficient if in the above-described process flowchart, the titles of chapters and the titles of sections are set as words contained in n rows of first-column cells, and the same process as the above performed for each cell of the table structure is performed. Concerning other types of hierarchical structures, correct translation can be realized by appropriately modifying the above process.

As described above, in the embodiment, when document data having a structure, such as a table structure (as shown, for example, in FIG. 2), enumerated structure, or hierarchical structure (e.g., chapter/section structure), is input to the document structure analysis unit 6, the unit 6 extracts a word or sentence set from the document data and stores it into the intra-structure data storing unit 7 (see FIG. 3). When a word or sentence is selected from the word or sentence set and translated, the intra-structure interpretation database 8 acquires, from the intra-structure data storing unit 7, first word or sentence sets having the same or equivalent attribute as the selected word or sentence (namely, each of the first word or sentence sets includes words or sentences as its elements that are arranged under a certain rule along with the selected word or sentence). For example, if the selected word is Japanese word "月" that is positioned at the second row and first column of FIG. 2, the word set elements at the second row and first column of FIG. 2 are acquired. After that, interpretation data items having the selected word as a headword are searched for, and the interpretation data item that includes a word set element identical to one of the first word set elements (the one word set element is considered identical from the condition contained in the interpretation data item) is selected. Based on the selected interpretation data item, the translation unit 4 translates the selected word.

Referring to the flowchart of FIG. 5 and to FIGS. 6 to 8, a description will be given of another example in which English document data having a table structure is translated into Japanese.

When English document data having the table structure shown in FIG. 6 is input as original document data to the input unit 1, the input unit 1 transmits the document data to the controller 2. In this case, since the input document is a table, the entire table of FIG. 6 is sent to the document structure analysis unit 6 (step S1). The other operations at step S1 are similar to those at step S1 of the case where translation from Japanese to English is performed.

The document structure analysis unit 6 analyzes the received table-structure data. In this case, it is determined that the data is a table that has three rows, and six columns in the first row, seven columns in the second row, and six columns in the third row, as is shown in FIG. 6 (step S2).

The intra-structure data storing unit 7 stores the table data extracted by the document structure analysis unit 6. FIG. 7 shows a storage example in which data is stored in a one-dimensional form. Specifically, the data items in the cells ranging from the first-row, first-column cell to the third-row, sixth-column cell are connected in series by separators "/" in a one-dimensional manner. If the words separated by "/" are sequentially followed, it is detected in which row and column each word is positioned. Alternatively, concerning words or sentences in, for example, (m×n) cells, information such as coordinates (m, n) may be attached to a word or sentence in each cell, and the words or sentences with the information be stored individually. The other operations at step S2 are similar to those at step S2 of the case where translation from Japanese to English is performed.

The controller 2 reads the words (or phrases) one by one from the cells of the table shown in FIG. 6, and sends the read word (or phrase) to the translation unit 4 along with, for example, the coordinate information of each cell (step S3). The operations at step S3 are similar to those at step S3 of the case where translation from Japanese to English is performed.

Assume here that the original phrase is "Speaker Info" contained in the cell of the first row and fifth column in the table of FIG. 6. In this case, only phrase "Speaker Info" may be sent as the original phrase. Alternatively, morpheme analysis may be performed on it, and the phrase and the analysis result be sent. Similarly, a structure analysis result, meaning analysis result, conversion result and/or generation result may be sent together with the phrase. Further, data (1, 5) is sent as coordinate data, since the original phrase is positioned at the first row and fifth column.

FIG. 8 shows an example of interpretation data stored in the intra-structure interpretation database 8. The interpretation data corresponds to each word or phrase in a word or phrase set that belongs to an arbitrary category, such as lecture information, computer-related information, net site term written in a first language (in this case, English). The interpretation data is used to translate such a word or phrase as the above into a corresponding word or phrase that belongs to the corresponding category in a second language (in this case, Japanese). Each interpretation data item contains a headword, part of speech, translation, and a word, phrase or sentence set that includes the headword and belongs to an arbitrary category. In the case of FIG. 8, the words or phrases included in the word set element are connected by separators "/". If the order of appearance of the words or phrases of a word set element included in interpretation data is predetermined, the words or phrases are arranged in the predetermined order. The other matters are similar to those described with reference to FIG. 4.

Upon receiving, from the translation unit 4, information concerning the to-be-translated original document data, and the coordinate information, the intra-structure interpretation database 8 accesses the intra-structure data storing unit 7 to acquire, based on the received coordinate information, a word set element arranged in the same column or row as that in the presently processed table (step S4). In this case, since the coordinates are (1, 5), the word set element corresponding to the cells of the first row, and the word set element corresponding to the cells of the fifth column are acquired from the data shown in FIG. 7 and stored in the intra-structure data storing unit 7. From FIG. 7, the word set element in the first row is "Overview, Agenda, Registration, Participants List, Speaker Info, Fees Info" (word set element A'). Similarly, the word set element in the fifth column is "Speaker Info, Monitor, FAQ" (word set element B').

After acquiring word set elements A' and B' from the intra-structure data storing unit 7, the intra-structure interpretation database 8 searches for interpretation data based on the original document data acquired from the translation unit 4. Using, for example, headword "Speaker" as a key, the interpretation data shown in FIG. 8 is searched (step S5). Assume here that the following two interpretation data items are acquired:

"Speaker Info; noun; 講演者情報;Overview/Agenda/Registration/Participants List/Speaker Info/Fees Info"

"Speaker; noun;スピーカー; CPU/Chipset/Display/Drive/HDD/Memory/OS"

The two interpretation data items contain respective word set elements "Overview, Agenda, Registration, Participants List, Speaker Info, Fees Info" (word set element C') and "CPU, Chipset, Display, Drive, HDD, Memory, OS" (word set element D'). At this time, matching is performed between word set elements C' and D', and word set elements A' and B' acquired from the original document data and stored in the intra-structure data storing unit 7 (step S6). For this matching, the above-described condition can be utilized effectively. For instance, to determine whether a word set element included in certain original document data is identical to a word set element included in certain interpretation data, the condition that k words or more included in the word set element of the original document data must be identical to those of the interpretation data may be employed. Alternatively, the condition that all words of the word set element must be identical between the original document data and the interpretation data may be employed. Similarly, the condition that only part of the word set element is identical between the original document data and the interpretation data may be employed. Further, the condition that all words of the word set element and even the order of arrangement of the words must be identical between the original document data and the interpretation data may be employed. Appropriate use of these conditions enables the matching process to be controlled freely.

In the above-mentioned case, the intra-structure interpretation database 8 determines that word set elements A' and C' are identical to each other, since the degree of matching therebetween is high. Accordingly, the former interpretation data item, i.e., "Speaker Info; noun; 講演者情報;Overview/Agenda/Registration/Participants List/Speaker Info/Fees Info", is selected (step S7). As is evident from the interpretation data items, each interpretation data item contains information, such as "part of speech" and "translation word", necessary for translation. In the case of the selected interpretation data item, Japanese word "講演者情報(Kouensha-Jouhou)" is selected as a translation of "Speaker Info" in the first row, fifth column cell of the table structure of the original document data, and is sent to the translation unit 4.

Upon receiving the interpretation result from the intra-structure interpretation database 8, the translation unit 4 performs translation processing based on the received interpretation result, and sends the translation result, i.e., the translation word "講演者情報", to the controller 2.

Upon receiving the translation result, the controller 2 sends it to the output unit 3 (step S8).

Thus, the machine translation system of FIG. 1 can output a correct translation result. In the same manner as the above, the word "Speaker" in the second row, sixth column cell of the table of FIG. 6 is translated into Japanese word "スピーカー(Supiikaa)". Namely, the same words existing in the same table but having different meanings can be correctly translated into different words corresponding to the respective meanings, by referring to each word in each column. Further, the word "Contact" in the third row, sixth column cell of the table of FIG. 6, which is hard to translate into the correct Japanese word out of context, can also be correctly translated into corresponding Japanese word "お問い合わせ(Otoiawase)" (instead of, for example, Japanese word "接触(Sesshoku)" different from the former), by referring to the words in the cells of the third row.

As described above, in the embodiment, when document data having a structure, such as a table structure (as shown, for example, in FIG. 6), enumerated structure, or hierarchical structure (e.g., chapter/section structure), is input to the document structure analysis unit 6, the unit 6 extracts a word set element from the document data and stores it into the intra-structure data storing unit 7 (see FIG. 7). When a word or phrase is selected from the word set element and translated, the intra-structure interpretation database 8 acquires, from the intra-structure data storing unit 7, first word set elements having the same or equivalent attribute as the selected word or phrase (namely, each of the first word set elements includes words or phrases as its elements that are arranged under a certain rule along with the selected word or phrase). For example, if the selected phrase is "Speaker Info" in the first row, fifth column cell of FIG. 6, the word set elements at the first row and fifth column of FIG. 6 are acquired. After that, interpretation data items having the selected phrase as a head-word are searched for, and the interpretation data item that includes a word set element identical to one of the first word set elements (the one word set element is considered identical from the condition contained in the interpretation data item) is selected. Based on the selected interpretation data item, the translation unit 4 translates the selected phrase.

As described above, in the embodiment, document data having a structure, such as a table structure, enumerated structure or chapter/section structure, can be translated in light of attributes in structure, the hierarchical and/or positional relationship in structure, etc. As a result, further accurate and reliable translation results can be acquired.

Figure 5:
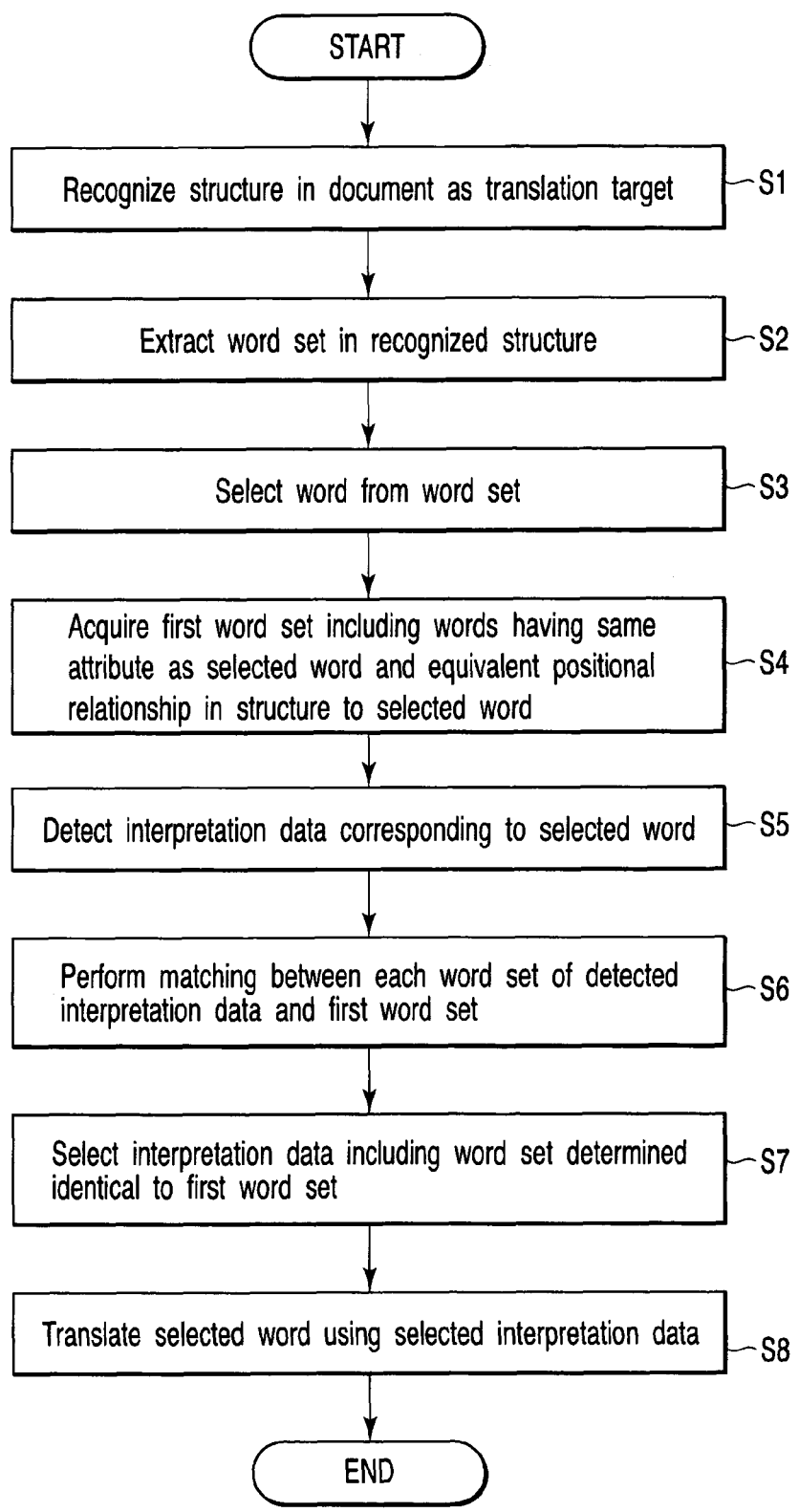
FIG. 5 is a flowchart useful in explaining the operation of the machine translation system of FIG. 1.

In addition, the operations performed by the machine translation system of FIG. 1 and shown in FIG. 5 can be stored in a recording medium as a program for instructing a computer to do the operations. The recording medium is, for example, a magnetic disk (flexible disk, hard disk, etc.), an optical disk (CD-ROM, DVD, etc.), or a semiconductor memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A machine translation system comprising:
a storage unit configured to store a plurality of interpretation data items each including a first expression element representing a first expression of a first language, an interpretation word set element including the first expression, and a second expression element representing a second expression of a second language, wherein the first expression is to be translated into the second expression, and the first expression and the second expression are included in a category;
an acquiring unit for acquiring:
a predetermined expression of the first language, the predetermined expression being included in a structure of a to-be-translated document, wherein words or sentences are arranged regularly in the structure, and
a first word set element including the predetermined expression and one or more expressions having equivalent positional relationship to the predetermined expression in the structure;
a detecting unit for:
detecting a subset from the plurality of interpretation data items, each of the subset including an expression element representing the predetermined expression and one or more word set elements, and
performing matching between the first word set element and each of the one or more word set elements of the detected subset based on at least one of a number and an order of expressions of the first word set element;
a selection unit for selecting, from the detected subset, an interpretation data item according to the matching; and
a translation unit for translating the predetermined expression into the second language, using the selected interpretation data item.

2. The system according to claim 1, wherein:
the storage unit contains, as all or several of the plurality of interpretation data items, a condition used to select an interpretation data item including a word set element corresponding to the first word set element; and
the selection unit selects the interpretation data item including the word set element corresponding to the first word set element, if the detected subset contains the condition and the expression element representing the predetermined expression satisfies the condition.

3. The system according to claim 2, wherein the condition concerns at least one of a first condition and a second condition, the first condition being used to determine that a number of expressions is identical between the first word set element of the to-be-translated document and each word set element included in the detected subset of the plurality of interpretation data items, the second condition being used to determine that an order of expressions is identical between the first word set element of the to-be-translated document and each word set element included in the detected subset of the plurality of interpretation data items.

4. The system according to claim 1, wherein the first word set element contains data representing a table structure of the to-be-translated document, and a plurality of expressions in the first word set element are arranged in rows and columns.

5. The system according to claim 1, wherein the first word set element contains data representing an enumerated structure of the to-be-translated document, and a plurality of expressions in the first word set element are enumerated expressions.

6. The system according to claim 1, wherein the first word set element contains data representing a chapter/section structure of the to-be-translated document, and a plurality of expressions in the first word set element are titles of chapters and titles of sections.

7. The system according to claim 1, wherein the stored plurality of interpretation data items contain expressions of the second language corresponding to expressions of the first language and parts of speech corresponding to the expressions.

8. A machine translation method, implemented using a computer, comprising:

preparing a storage unit configured to store a plurality of interpretation data items each including a first expression element representing a first expression of a first language, an interpretation word set element including the first expression, and a second expression element representing a second expression of a second language, wherein the first expression is to be translated into the second expression, and the first expression and the second expression are included in a category;

acquiring, by the computer, a predetermined expression of the first language, the predetermined expression being included in a structure of a to-be-translated document, wherein words or sentences are arranged regularly in the structure;

acquiring, by the computer, a first word set element including the predetermined expression and one or more expressions having equivalent positional relationship to the predetermined expression in the structure;

detecting, by the computer, a subset from the plurality of interpretation data items, each of the subset including an expression element representing the predetermined expression and one or more word set elements;

performing, by the computer, matching between the first word set element and each of the one or more word set elements of the detected subset based on at least one of a number and an order of expressions of the first word set element;

selecting, by the computer, from the detected subset, an interpretation data item according to the matching; and translating, by the computer, the predetermined expression into the second language, using the selected interpretation data item.

9. The method according to claim 8, wherein:

the storage unit contains, as all or several of the plurality of interpretation data items, a condition used to select an interpretation data item including a word set element corresponding to the first word set element; and the method further includes selecting the interpretation data item including the word set element corresponding to the first word set element, if the detected subset contains the condition and the expression element representing the predetermined expression satisfies the condition.

10. The method according to claim 9, wherein the condition concerns at least one of a first condition and a second condition, the first condition being used to determine that a number of expressions is identical between the first word set element of the to-be-translated document and each word set element included in the detected subset of the plurality of interpretation data items, the second condition being used to determine that an order of expressions is identical between the first word set element of the to-be-translated document and each word set element included in the detected subset of the plurality of interpretation data items.

11. The method according to claim 8, wherein the first word set element contains data representing a table structure of the to-be-translated document, and a plurality of expressions in the first word set element are arranged in rows and columns.

12. The method according to claim 8, wherein the first word set element contains data representing an enumerated structure of the to-be-translated document, and a plurality of expressions in the first word set element are enumerated expressions.

13. The method according to claim 8, wherein the first word set element contains data representing a chapter/section structure of the to-be-translated document, and a plurality of expressions in the first word set element are titles of chapters and titles of sections.

14. The method according to claim 8, wherein the stored plurality of interpretation data items contain expressions of the second language corresponding to expressions of the first language and parts of speech corresponding to the expressions.

15. A non-transitory computer-readable medium including computer executable instructions, wherein the instructions, when executed by a processor, cause the processor to perform a method comprising:

storing, in a storage unit, a plurality of interpretation data items each including a first expression element representing a first expression of a first language, an interpretation word set element including the first expression, and a second expression element representing a second expression of a second language, wherein the first expression is to be translated into the second expression, and the first expression and the second expression are included in a category;

acquiring a predetermined expression of the first language, the predetermined expression being included in a structure of a to-be-translated document, wherein words or sentences are arranged regularly in the structure;

acquiring a first word set element including the predetermined expression and one or more expressions having equivalent positional relationship to the predetermined expression in the structure;

detecting a subset from the plurality of interpretation data items, each of the subset including an expression element representing the predetermined expression and one or more word set elements;

performing matching between the first word set element and each of the one or more word set elements of the detected subset based on at least one of a number and an order of expressions of the first word set element;

selecting, from the detected subset, an interpretation data item according to the matching; and translating the predetermined expression into the second language, using the selected interpretation data item.

16. The non-transitory computer-readable medium according to claim 15, wherein the storage unit contains, as all or several of the plurality of interpretation data items, a condition used to select an interpretation data item including a word set element corresponding to the first word set element, and the method further includes selecting the interpretation data item including the word set element corresponding to the first word set element, if the detected subset contains the condition and the expression element representing the predetermined expression satisfies the condition.

17. The non-transitory computer-readable medium according to claim 16, wherein the condition concerns at least one of a first condition and a second condition, the first condition being used to determine that a number of expressions is identical between the first word set element of the to-be-translated document and each word set element included in the detected subset of the plurality of interpretation data items, the second condition being used to determine that an order of expressions is identical between the first word set element of the to-be-translated document word set element and each word set element included in the detected subset of the plurality of interpretation data items.

18. The non-transitory computer-readable medium according to claim 15, wherein the first word set element contains data representing a table structure of the to-be-translated document, and a plurality of expressions in the first word set element are arranged in rows and columns.

19. The non-transitory computer-readable medium according to claim 15, wherein the first word set element contains data representing an enumerated structure of the to-be-translated document, and a plurality of expressions in the first word set element are enumerated expressions.

20. The non-transitory computer-readable medium according to claim 15, wherein the first word set element contains data representing a chapter/section structure of the to-be-translated document, and a plurality of expressions in the first word set element are titles of chapters and titles of sections.

21. The non-transitory computer-readable medium according to claim 15, wherein the stored plurality of interpretation data items contain expressions of the second language corresponding to expressions of the first language and parts of speech corresponding to the expressions.

* * * * *